United States Patent
Wong et al.

(10) Patent No.: US 8,422,645 B1
(45) Date of Patent: Apr. 16, 2013

(54) VOICEMAIL NETWORK CAPACITY PLANNING AND MANAGEMENT

(75) Inventors: Kanglung Wong, Overland Park, KS (US); Caleb S. Hyde, Overland Park, KS (US); Brendan Lee Hughes, Overland Park, KS (US); Narayanan Govindan Kasi, Overland Park, KS (US)

(73) Assignee: Spring Communications Company L.P., Overland Park, KS (US)

( * ) Notice: Subject to any disclaimer, the term of this patent is extended or adjusted under 35 U.S.C. 154(b) by 970 days.

(21) Appl. No.: 12/170,702

(22) Filed: Jul. 10, 2008

(51) Int. Cl.
*H04M 11/00* (2006.01)
*H04L 12/26* (2006.01)
*H04J 3/16* (2006.01)
*G06F 17/00* (2006.01)

(52) U.S. Cl.
USPC ........ 379/88.22; 370/236; 370/400; 370/419; 370/467; 379/15.03; 379/88.16; 379/121.01; 379/211.02; 379/221.11; 455/412.1; 455/413; 455/466; 709/224; 709/239; 715/810

(58) Field of Classification Search .......... 370/400, 370/419, 467, 236; 379/88.13, 88.18, 88.22, 379/121.01, 211.02, 221.11, 88.16, 88.23, 379/88.25, 15.03; 455/412.1, 413, 466; 709/224, 709/239; 715/810
See application file for complete search history.

(56) References Cited

U.S. PATENT DOCUMENTS

| | | | | |
|---|---|---|---|---|
| 5,359,642 A * | 10/1994 | Castro | ...................... | 379/121.01 |
| 5,781,615 A | 7/1998 | Bales et al. | | |
| 6,463,292 B1 * | 10/2002 | Rahman | ...................... | 455/466 |
| 6,771,949 B1 * | 8/2004 | Corliss | ....................... | 455/413 |
| 6,795,448 B1 * | 9/2004 | Lee et al. | ....................... | 370/419 |
| 6,810,114 B2 * | 10/2004 | Welfley | ...................... | 379/88.18 |
| 7,023,867 B1 * | 4/2006 | Park et al. | ...................... | 370/419 |
| 7,085,554 B2 * | 8/2006 | Picard et al. | ...................... | 455/413 |
| 7,167,486 B2 * | 1/2007 | Cornelius et al. | ............. | 370/467 |
| 7,215,755 B2 * | 5/2007 | Novack | ..................... | 379/221.11 |
| 7,251,314 B2 * | 7/2007 | Huang | ....................... | 379/88.13 |
| 7,529,253 B2 * | 5/2009 | Lee et al. | ....................... | 370/400 |
| 7,707,308 B1 * | 4/2010 | Hogge et al. | ................... | 709/239 |
| 7,787,599 B2 * | 8/2010 | Evans | ....................... | 379/15.03 |
| 2002/0097848 A1 * | 7/2002 | Wesemann et al. | ........ | 379/88.18 |
| 2004/0121761 A1 * | 6/2004 | Tripathy et al. | ............... | 455/413 |
| 2006/0025113 A1 * | 2/2006 | Nguyen et al. | .............. | 455/412.1 |
| 2009/0253413 A1 * | 10/2009 | Sigmund et al. | .............. | 455/413 |
| 2009/0319654 A1 * | 12/2009 | Gonzalez et al. | ............. | 709/224 |
| 2010/0098236 A1 * | 4/2010 | Pearson | .................... | 379/211.02 |

* cited by examiner

*Primary Examiner* — Gerald Gauthier

(57) ABSTRACT

A method of managing a voicemail network is described herein. Voicemail system data for the voicemail network is received. The voicemail system data includes communication node data, source voicemail node data, and destination voicemail node data. A destination voicemail node is determined based on the destination voicemail node data and a destination voicemail node criteria. When the source voicemail node data meets a source voicemail node criteria, a communication node is associated with the destination voicemail node.

21 Claims, 7 Drawing Sheets

VOICEMAIL NETWORK CAPACITY PLANNING AND MANAGEMENT

TECHNICAL BACKGROUND

Telecommunication services have become a ubiquitous characteristic of the modern world. Telecommunication networks are a complex network of links and nodes arranged so that communications may be passed from one device to another across the network. Millions of people around the world subscribe to telecommunication services.

Voicemail networks today are large, complex systems that are costly to organize and manage. Voicemail networks are often reorganized in order to balance cellular sites or subscribers across switches. Further, optimization of voicemail networks may involve the addition or removal of switches from the network. In order to reorganize a voicemail network, each voicemail platform and switch must be monitored to ensure that their capacity is not exceeded during the reorganization.

OVERVIEW

A method of managing a voicemail network is described herein. Voicemail system data for the voicemail network is received. The voicemail system data includes communication node data, source voicemail node data, and destination voicemail node data. A destination voicemail node is determined based on the destination voicemail node data and a destination voicemail node criteria. When the source voicemail node data meets a source voicemail node criteria, a communication node is associated with the destination voicemail node.

A method of managing a voicemail network that includes a communication node associated with a source voicemail node is also described herein. Voicemail system data for the voicemail network is received. The voicemail system data comprises communication node data, source voicemail node data, and destination voicemail node data. A destination voicemail node is determined based on the destination voicemail node data and a destination voicemail node criteria. The destination voicemail node criteria includes a capacity of the destination node and a proximity of the destination node to the communication node. The communication node is associated with the destination voicemail node when the source voicemail node data meets a source voicemail node criteria.

A voicemail network management system is also described herein. An interface receives voicemail system data for a voicemail network. The voicemail system data comprises communication node data, source voicemail node data, and destination voicemail node data. A processing system processes the voicemail system data to determine a destination voicemail node based on the destination voicemail node data and a destination voicemail node criteria. In response to determining a destination voicemail node, the processing system processes the voicemail system data to associate a communication node with the destination voicemail node when the source voicemail node data meets a source voicemail node criteria.

DETAILED DESCRIPTION

FIGS. 1-7 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
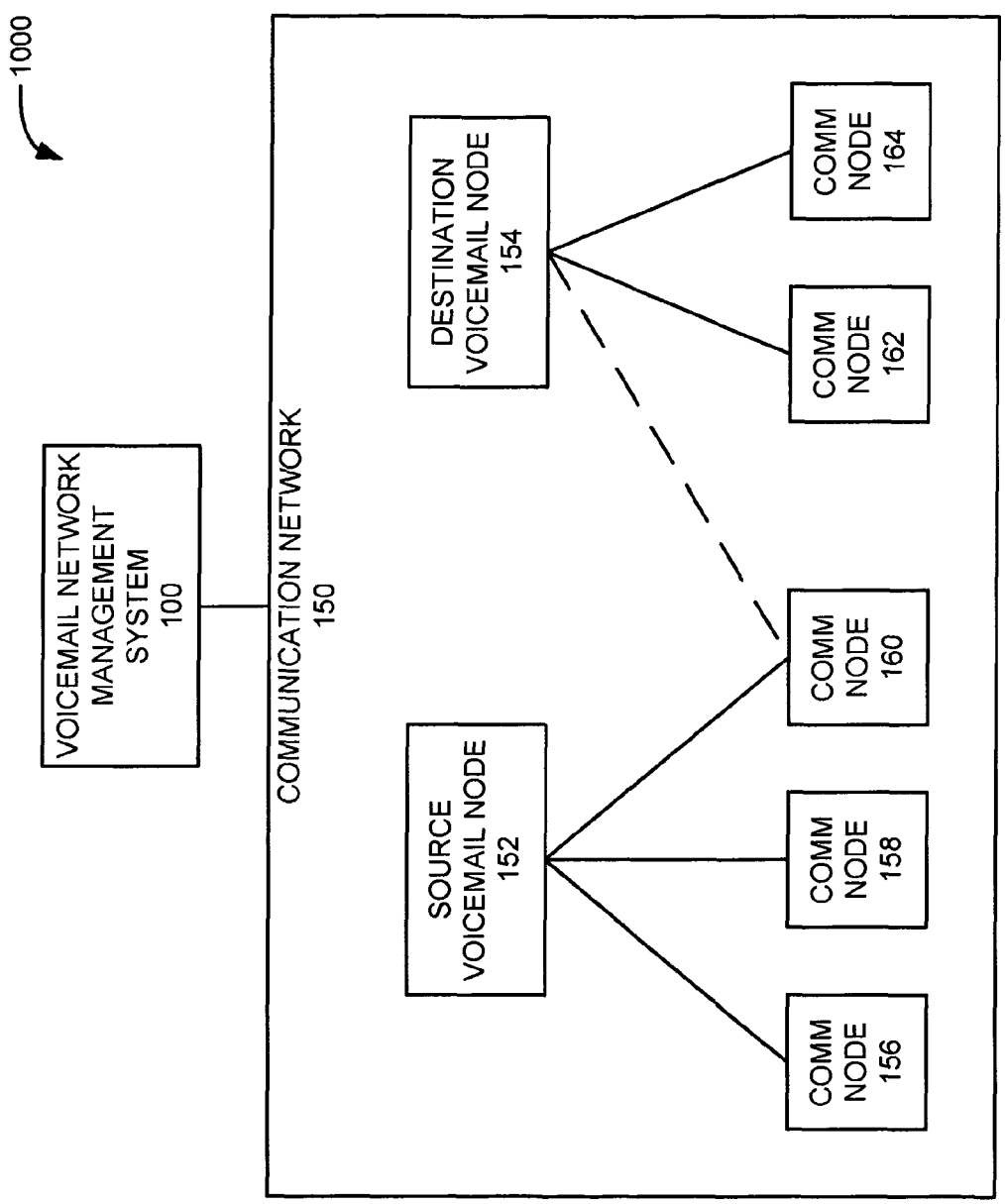
FIG. 1 is a block diagram that illustrates a communication system.

FIG. 1 is a block diagram that illustrates communication system 1000. Communication system 1000 comprises voicemail network management system 100 and communication network 150. Communication network 150 comprises source voicemail node 152, destination voicemail node 154, and communication nodes 156, 158, 160, 162, and 164. Voicemail network management system 100 is in communication with communication network 150. Source voicemail node 152 is in communication with communication nodes 156, 158, and 160. Destination voicemail node 154 is initially in communication with communication nodes 162 and 164. After the execution of the method illustrated in FIG. 2, destination voicemail node 154 is also in communication with communication node 160, as illustrated by the dashed line in FIG. 1.

Source voicemail node 152 and destination voicemail node 154 may comprise a plurality of message nodes and one or more databases. A message node, or message serving unit, may contain a plurality of individual voicemail boxes. A database within source voicemail node 152 or destination voicemail node 154 may associate a number of a mobile device with a voicemail box. For example, the database may store a 10-digit telephone number of a subscriber's wireless device in association with the subscriber's voicemail box. The 10-digit telephone number may comprise a 3-digit area code followed by a 7-digit local number.

Source voicemail node 152 and destination voicemail node 154 may also comprise a plurality of access nodes. An access node, or port, may be configured to connect source voicemail node 152 or destination voicemail node 154 to a digital transmission link, such as a T-1 link. The access node may comprise a T-1 port, an Internet Protocol (IP) port, an Ethernet port, or some other type of transmission port. A plurality of T-1 links may connect source voicemail node 152 with communication nodes 156, 158, and 160. A plurality of T-1 links may connect destination voicemail node 154 with communication nodes 160, 162, and 164.

The access node may also be configured to connect source voicemail node 152 or destination voicemail node 154 to an Ethernet, an IP link, or some other form or wireless or wireline link. The links between the voicemail nodes and the communication nodes may be direct links or may comprise various intermediate systems and components.

In some embodiments, source voicemail node 152 or destination voicemail node 154 may be in communication with communication nodes 156, 158, 160, 162, and 164 through one or more gateway systems or communication networks. For example, a source voicemail node could be connected to a gateway system over an IP link, and the gateway system could be connected to a communication node over a T-1 link.

Source voicemail node 152 and destination voicemail node 154 may be grouped geographically or may be geographically diverse. Communication nodes 156, 158, 160, 162, and 164 may be grouped geographically or may be geographically diverse.

In some examples, a voicemail node may be a source voicemail node or a destination voicemail node, depending upon the implementation of the method described herein. In some examples, a voicemail node may be both a source voicemail node and a destination voicemail node or may switch back and forth between the two.

Figure 2:
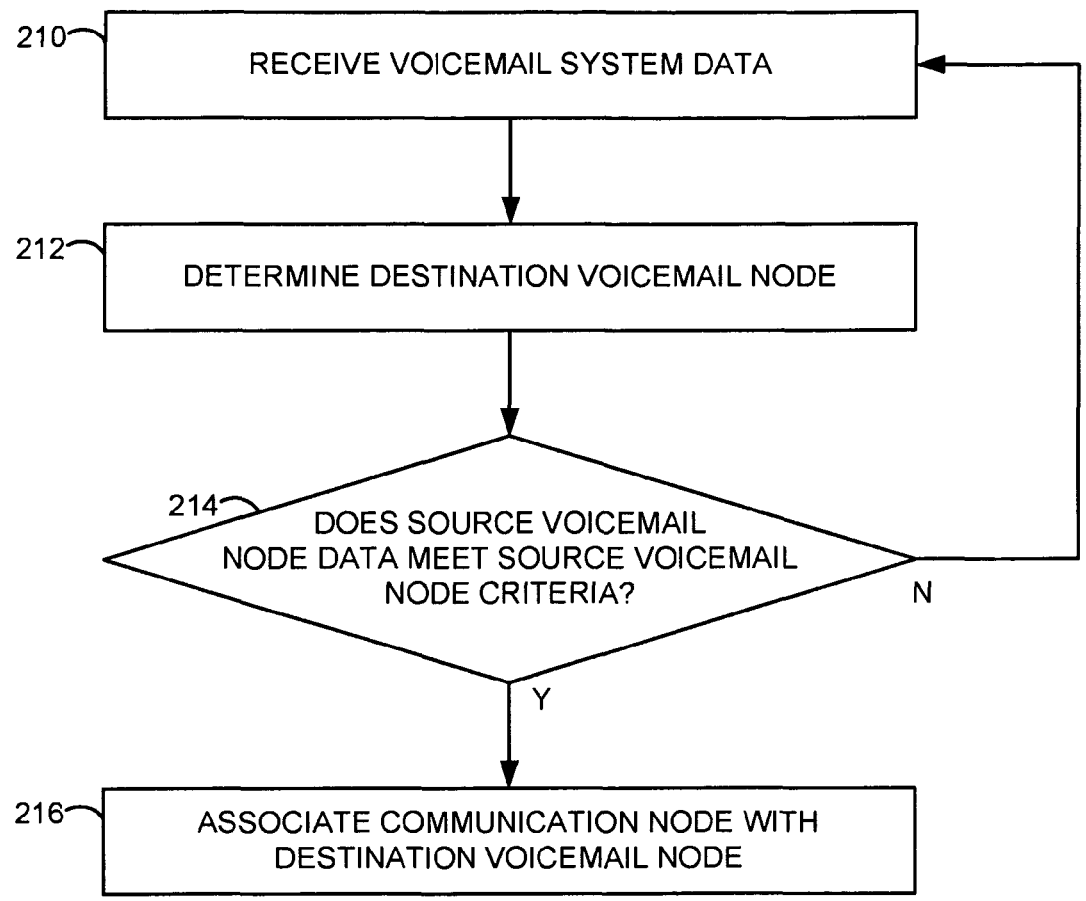
FIG. 2 is a flow diagram that illustrates a method of operating a communication system.

FIG. 2 is a flow diagram that illustrates a method that may be used for operating communication system 1000. Voicemail network management system 100 receives voicemail system data (operation 210). The voicemail system data may include source voicemail node data, destination voicemail node data, and communication node data comprising operational measurements of a source voicemail node, a destination voicemail node, and a communication node, respectively. The operational measurements comprise a number of subscribers, a number of busy-hour call attempts, a capacity of a node, a geographic location of a node, an identity and a location of one or more communication nodes associated with a voicemail node, a destination voicemail node criteria, a source voicemail node criteria, a projected growth of a node, a proximity of a voicemail node to a communication node, or any other data related to a node.

The capacity of a node may include a number of message nodes and a number of access nodes. The number of message nodes may include a number of message serving units in use, a number of message serving units available, and a number of additional message serving units that may be added to the node. The number of access nodes may include a number of ports in use, a number of ports available, and a number of additional ports that may be added to the nodes.

The projected growth of a node may include a forecasted utilization of the message serving units and a forecasted utilization of the ports. The number of busy-hour call attempts is the number of telephone calls attempted at the busiest hour, or peak hour, of the day.

Returning to FIG. 2, voicemail network management system 100 determines a destination voicemail node based on the destination voicemail node data and the destination voicemail node criteria (operation 212). For example, voicemail network management system 100 selects destination voicemail node 154 because destination voicemail node 154 contains sufficient capacity to support an association with communication node 160 in addition to communication nodes 162 and 164.

Voicemail network management system 100 then determines whether the source voicemail node data meets a source voicemail node criteria (operation 214). For example, voicemail network management system 100 determines whether source voicemail node 152 contains sufficient capacity to support a projected growth of communication nodes 156, 158, and 160.

If the source voicemail node data meets the source voicemail node criteria, then the process returns to operation 210. For example, if voicemail network management system 100 determines that source voicemail node 152 contains sufficient capacity to support the projected growth of communication nodes 156, 158, and 160, then voicemail network management system 100 goes back to receiving voicemail system data. However, if the source voicemail node data does not meet the source voicemail node criteria, then voicemail network management system 100 associates communication node 160 with destination voicemail node 154 (operation 216). For example, if voicemail network management system 100 determines that source voicemail node 152 does not contain sufficient capacity to support the projected growth of communication nodes 156, 158, and 160, then voicemail network management system 100 associates communication node 160 with destination voicemail node 154 as depicted by the dashed line in FIG. 1. In some embodiments, associating a communication node with a voicemail node is referred to as rehoming the communication node.

In some implementations, voicemail network management system 100 disassociates communication node 160 from source voicemail node 152 before associating communication node 160 with destination voicemail node 154. In some embodiments, disassociating a communication node from a voicemail node and then associating the communication node with a different voicemail node is referred to as rehoming the communication node.

In some implementations, voicemail network management system 100 performs operation 214 before performing operation 212. For example, after receiving the voicemail system data, voicemail network management system 100 determines if the source voicemail node data meets the source voicemail node criteria. If the source voicemail node data does meet the source voicemail node criteria, then voicemail network management system 100 selects a destination voicemail node and associates the communication node with the destination voicemail node. In some implementations, voicemail network management system 100 performs operations 212 and 214 simultaneously.

While the operations of the method depicted in FIG. 2 are described above in conjunction with communication system 1000 of FIG. 1, the method may be executed by employing other systems or devices in other embodiments. Also, while FIG. 2 indicates a particular order of execution for the operations of the method illustrated therein, other orders of execution, including concurrent execution of one or more of the operations, are possible while remaining within the scope of the invention.

Figure 3:
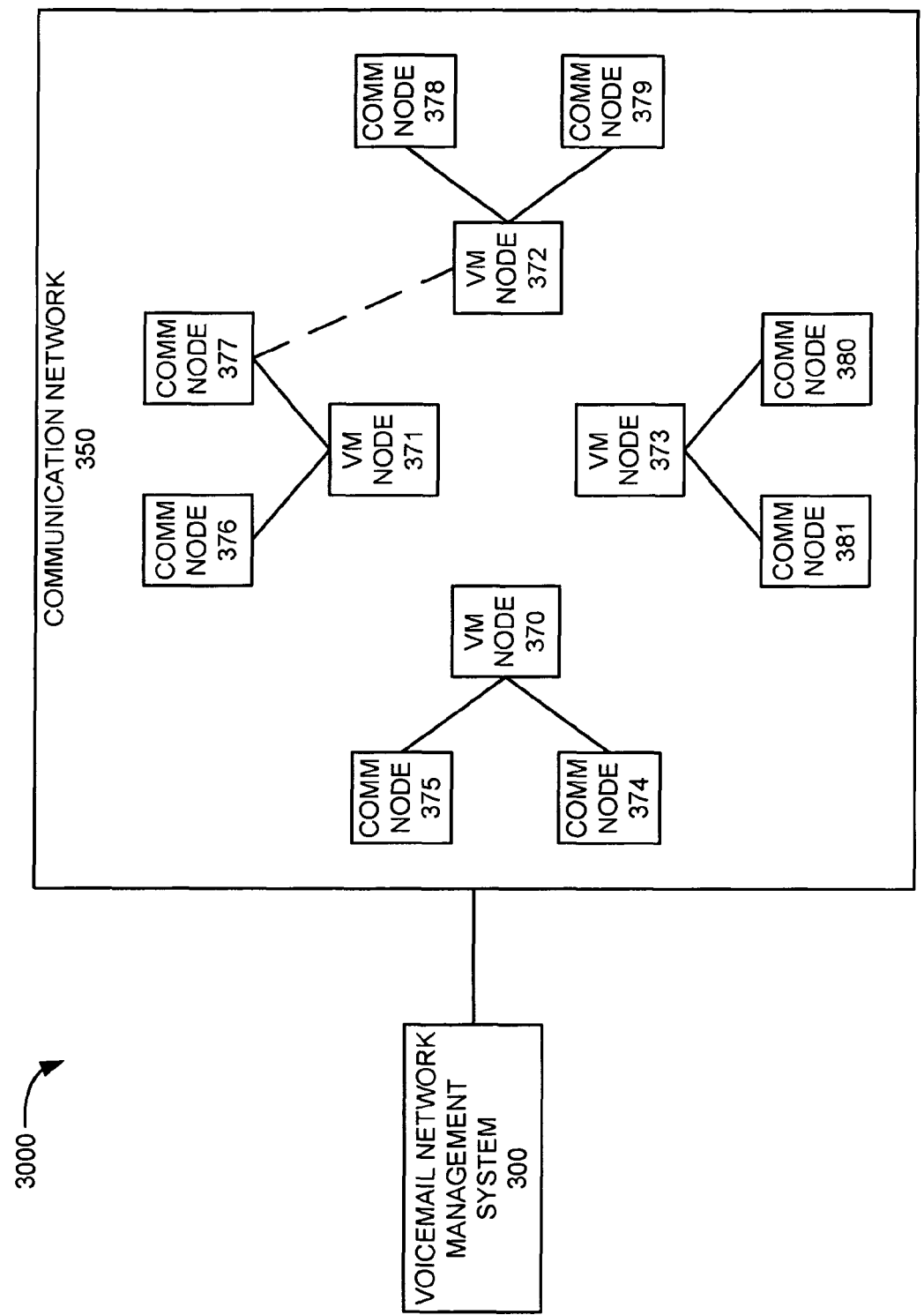
FIG. 3 is a block diagram that illustrates a communication system.

FIG. 3 is a block diagram that illustrates communication system 3000. Communication system 3000 comprises voicemail network management system 300 and communication network 350. Communication network 350 comprises voicemail nodes 370-373 and communication nodes 374-381. Voicemail network management system 300 is in communication with communication network 350. Communication nodes 374 and 375 are associated with voicemail node 370. Communication nodes 376 and 377 are associated with voicemail node 371. Communication nodes 378 and 379 are associated with voicemail node 372. Communication nodes 380 and 381 are associated with voicemail node 373.

Figure 4:
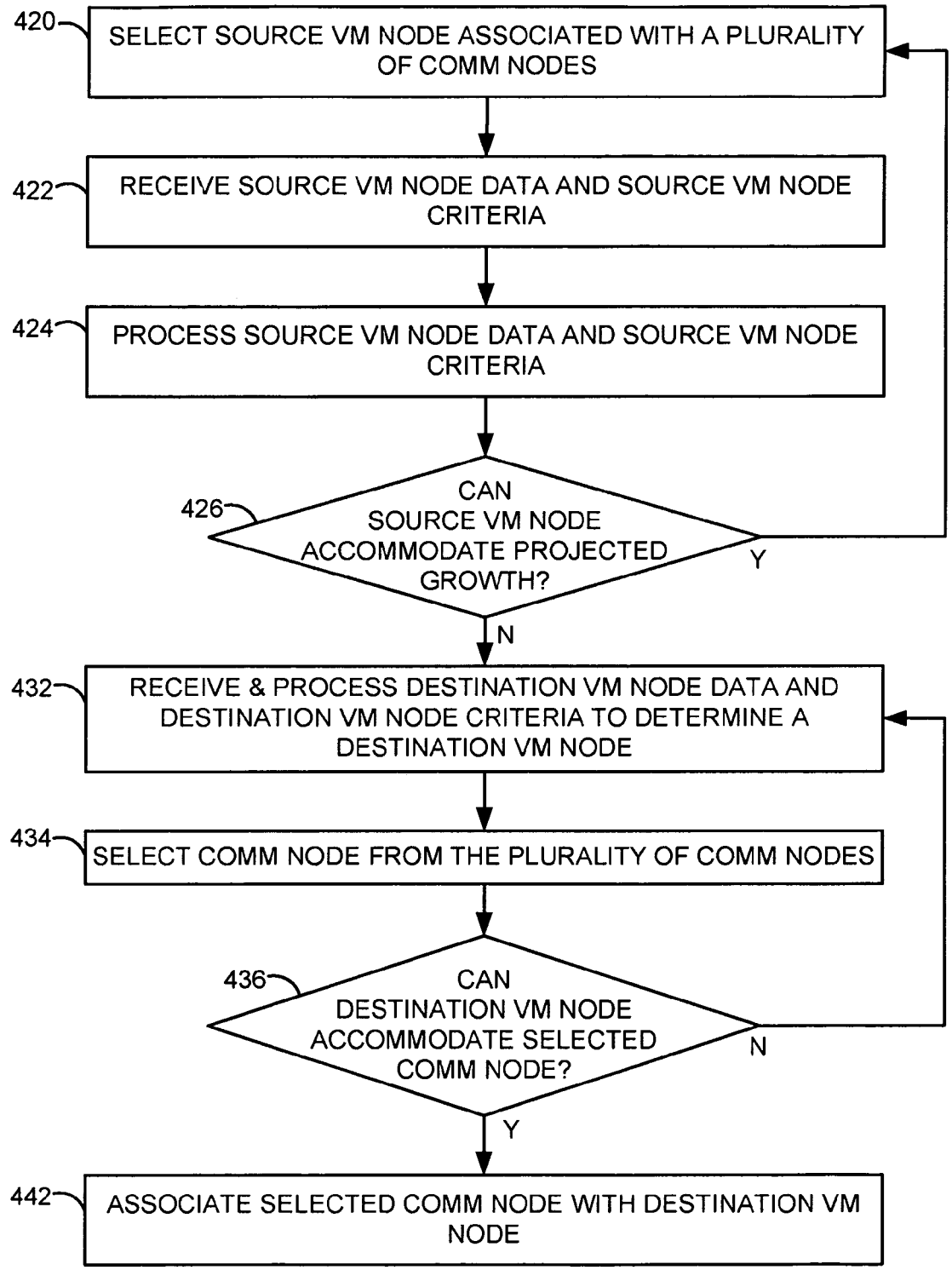
FIG. 4 is a flow diagram that illustrates a method of operating a voicemail network management system.

FIG. 4 is a flow diagram that illustrates a method of operating communication system 3000. Voicemail network management system 300 selects a source voicemail node that is associated with a plurality of communication nodes (operation 420). For example, voicemail network management system 300 selects voicemail node 371 to analyze using the method described in FIG. 4 based on a schedule, an alarm, an operator input, or some other indicator.

Voicemail network management system 300 then receives source voicemail node data and source voicemail node criteria (operation 422). For example, voicemail network management system 300 receives source voicemail node data related to source voicemail node 371 that includes a capacity of source voicemail node 371 and a projected growth of source voicemail node 371. Voicemail network management system 300 also receives source voicemail node criteria that includes a capacity management threshold for source voicemail node 371. The capacity management threshold may be a utilization percentage, a number of unused access nodes, a number of unused message nodes, or any capacity measurement of source voicemail node 371.

In response to receiving the source voicemail node data and the source voicemail node criteria, voicemail network management system 300 processes the source voicemail node data and the source voicemail node criteria (operation 424) to determine whether the source voicemail node can accommodate the projected growth of the source voicemail node (operation 426). If the source voicemail node has the capacity to accommodate the projected growth, then voicemail network management system 300 returns to operation 420 and selects a difference voicemail box for analysis.

However, if the source voicemail node does not have the capacity to accommodate the projected growth, then voicemail network management system 300 receives and processes a destination voicemail node data and a destination voicemail node criteria to determine a destination voicemail node (operation 432). For example, voicemail network management system 300 receives data related to voicemail nodes 370, 372, and 373. Voicemail network management system 300 then analyzes the data to determine whether any of nodes 370, 372, or 373 meet the destination voicemail node criteria. Voicemail network management system 300 analyzes the potential destination voicemail node based on a capacity of the potential destination voicemail node and a proximity of the potential destination voicemail node to either the source voicemail node or a communication node associated with the source voicemail node. The capacity of the potential destination voicemail node comprises a number of message nodes and a number of access nodes. In this example, voicemail network management system 300 then selects node 372 as the destination voicemail node.

Voicemail network management system 300 selects a communication node for rehoming from the plurality of communication nodes associated with the source voicemail node (operation 434). For example, voicemail network management system 300 analyzes communication nodes 376 and 377 associated with source voicemail node 371 and determines that communication node 377 should be rehomed to destination voicemail node 372.

Voicemail network management system 300 determines whether the destination voicemail node can accommodate the selected communication node (operation 436). If the destination voicemail node has the capacity to accommodate the communication node selected for rehoming, then the selected communication node is disassociated from the source voicemail node and associated with the destination voicemail node (operation 442). If the destination voicemail node does not have the capacity to accommodate the communication node selected for rehoming, then voicemail network management system 300 returns to operation 432 to select a different destination voicemail node. For example, if voicemail network management system 300 determines that destination voicemail node 372 contains the capacity to accommodate communication node 377, the communication node 377 is rehomed from source voicemail node 371 to destination voicemail node 372 (as illustrated by the dashed line in FIG. 3). However, if voicemail network management system 300 determines that destination voicemail node 372 does not have enough capacity to accommodate communication node 377, then voicemail network management system 300 returns to operation 432 to select a different destination voicemail node for rehoming communication node 377.

In some implementations, voicemail network management system 300 performs operation 434 before it performs operation 432. For example, voicemail network management system 300 selects communication node 377 for rehoming and then selects voicemail node 372 as the destination voicemail node.

In some embodiments, voicemail network management system 300 may add a new voicemail node to serve as a destination voicemail node for the rehoming. For example, if none of voicemail nodes 370, 372, and 373 meet the destination voicemail node criteria, then voicemail network management system 300 adds a new voicemail node to communication network 350 and rehomes communication node 377 to the new voicemail node.

While the operations of the method depicted in FIG. 4 are described above in conjunction with communication system 3000 of FIG. 3, the method may be executed by employing other systems or devices in other embodiments. Also, while FIG. 4 indicates a particular order of execution for the operations of the method illustrated therein, other orders of execution, including concurrent execution of one or more of the operations, are possible while remaining within the scope of the invention.

Figure 5:
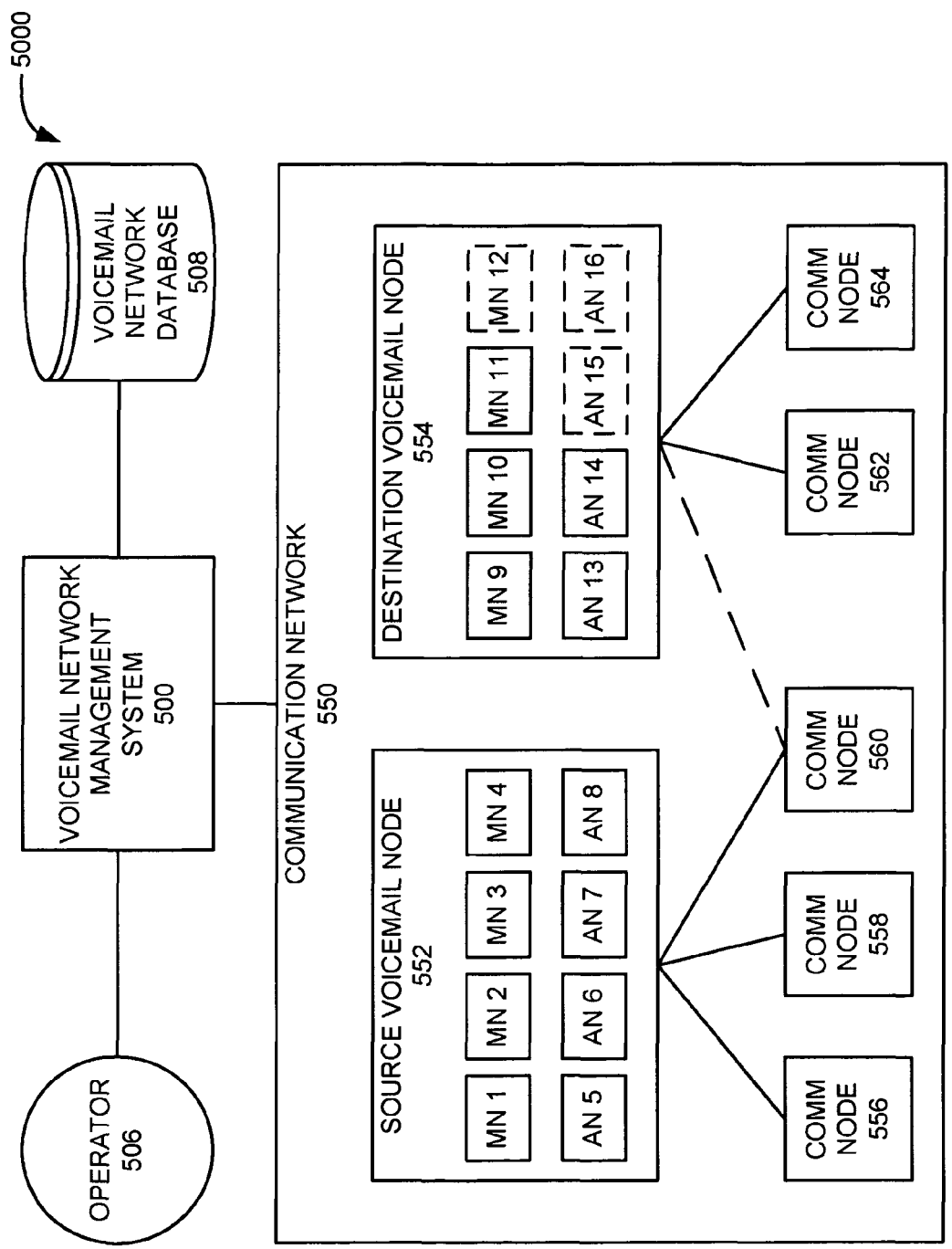
FIG. 5 is a block diagram that illustrates a communication system.

FIG. 5 is a block diagram that illustrates communication system 5000. Communication system 5000 comprises voicemail network management system 500, communication network 550, operator 506, and voicemail network database 508. Communication network 550 comprises source voicemail node 552, destination voicemail node 554, and communication nodes 556, 558, 560, 562, and 564. Source voicemail node 552 comprises message nodes 1-4 and access nodes 5-8. Destination voicemail node 554 comprises message nodes 9-12 and access nodes 13-16. Note that message node 12 and access nodes 15 and 16 are depicted with dashed lines in FIG. 5 because they are added to destination voicemail node 554 during the method described in FIG. 6.

Operator 506 is in communication with voicemail network management system 500. Voicemail network database 508 is in communication with voicemail network management system 500. Communication network 550 is in communication with voicemail network management system 500. Communication nodes 556, 558, and 560 are associated with source voicemail node 552. Initially, communication nodes 562 and 564 are associated with destination voicemail node 554. After the implementation of the process illustrated in FIG. 6, communication node 560 is also associated with destination voicemail node 554, as depicted by the dashed line in FIG. 5.

Operator 506 may be a human operator, a computer system, or some other element that transfers data to voicemail network management system 500. Voicemail network database 508 may be a voicemail management database, an internal database, an external database, or any other source of voicemail network data available to voicemail network management system 500. Please refer to the description of FIG. 1 for a detailed explanation of message nodes and access nodes as depicted by message nodes 1-4 and 9-12 and access nodes 5-6 and 13-16 in FIG. 5.

Figure 6:
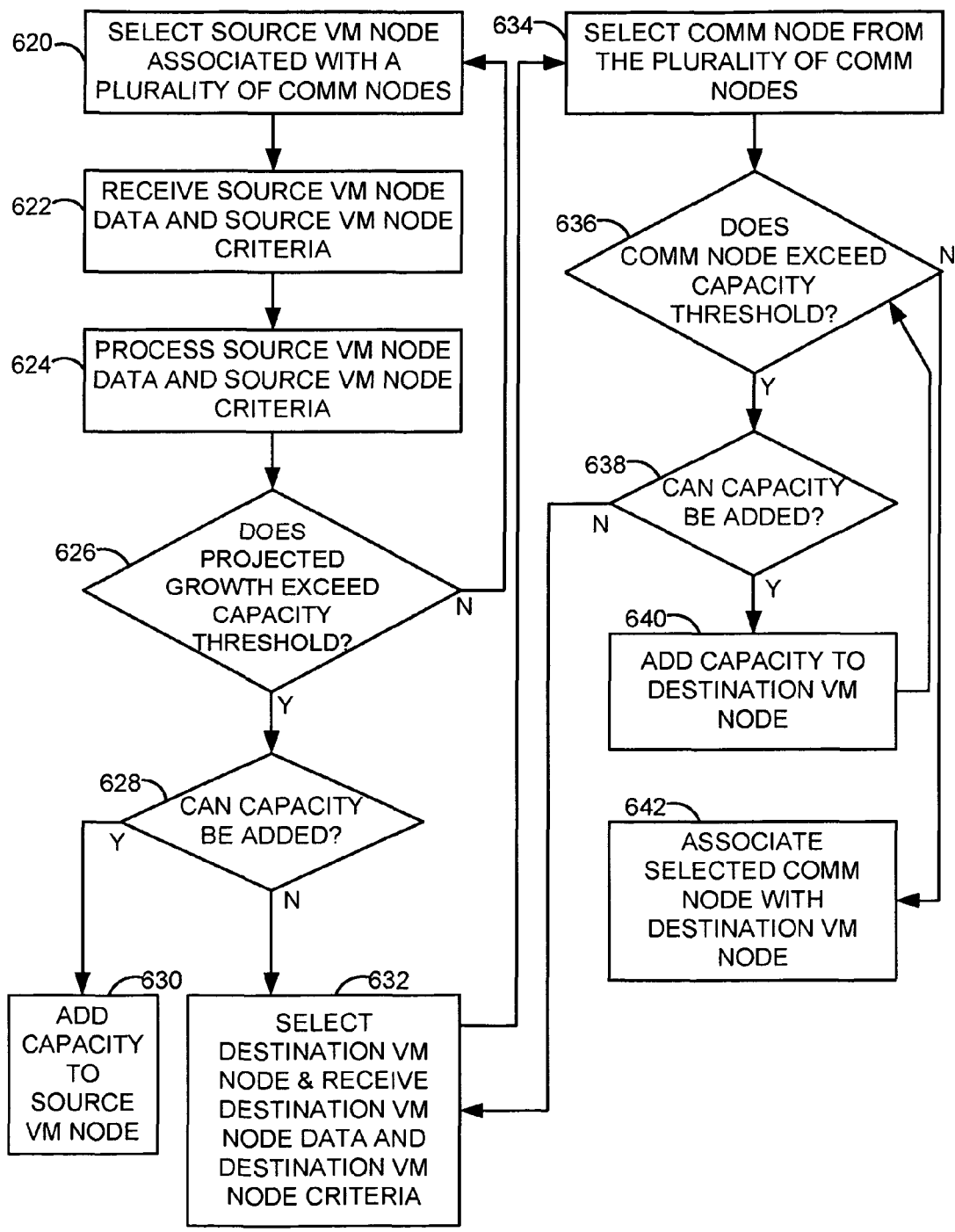
FIG. 6 is a flow diagram that illustrates a method of operating a voicemail network management system.

FIG. 6 is a flow diagram that illustrates a method of operating communication system 5000. Operator 506 selects a source voicemail node from a plurality of source voicemail nodes for analysis (operation 620). The selected source voicemail node is associated with a plurality of communication nodes. For example, operator 506 selects source voicemail node 552 for analysis using voicemail network management system 500. Source voicemail node 552 is associated with communication nodes 556, 558, and 560.

Voicemail network management system 500 receives source voicemail node data related to source voicemail node 552 from voicemail network database 508 (operation 622). Voicemail network management system 500 also receives source voicemail node criteria from operator 506 (operation 622). For example, voicemail network management system 500 receives the capacity and projected growth of source voicemail node 552 from voicemail network database 508. Voicemail network management system 500 also receives a capacity management threshold or criteria from operator 506. The capacity management threshold could be a percentage utilization of source voicemail node 552, such as 80%.

Voicemail network management system 500 processes the source voicemail node data and the source voicemail node criteria (operation 624) to determine whether the projected growth of source voicemail node 552 exceeds the capacity management threshold entered by operator 506 (operation 626). If the projected growth does not exceed the capacity management threshold, then the process returns to operation 620 where operator 506 selects a different source voicemail node for analysis.

However, if the projected growth of source voicemail node 552 exceeds the capacity management threshold, then voicemail network management system 500 determines whether or not capacity can be added to source voicemail node 552 (operation 628). For example, if the projected growth of source voicemail node 552 exceeds the capacity management threshold of 80%, then voicemail network management system 500 checks source voicemail node 552 to determine whether additional message nodes and/or access nodes can be added to source voicemail node 552.

If additional capacity can be added to the source voicemail node, then voicemail network management system 500 adds message nodes and/or access nodes to the source voicemail node to accommodate the projected growth of the source voicemail node (operation 630). However, if additional capacity cannot be added to the source voicemail node, then operator 506 selects a destination voicemail node for analysis (operation 632). For example, operator 506 selects destination voicemail node 554 for analysis using voicemail network management system 500.

Voicemail network management system 500 receives destination voicemail node data related to destination voicemail node 554 from voicemail network database 508 (operation 632). Voicemail network management system 500 also receives destination voicemail node criteria from operator 506 (operation 632). For example, voicemail network management system 500 receives the capacity and projected growth of destination voicemail node 554 from voicemail network database 508. Voicemail network management system 500 also receives a capacity management threshold or criteria from operator 506. The capacity management threshold could be a percentage utilization of destination voicemail node 554, such as 80%.

Voicemail network management system 500 selects a communication node from the plurality of communication nodes associated with the source voicemail node (operation 634). For example, voicemail network management system 500 selects communication node 560 associated with source voicemail node 552 for rehoming to destination voicemail node 554.

Voicemail network management system 500 then determines whether rehoming the selected communication node to the destination voicemail node exceeds the capacity management threshold (operation 636). For example, voicemail network management system 500 determines whether rehoming communication node 560 to destination voicemail node 554 exceeds the capacity management threshold of destination voicemail node 554, wherein the capacity management threshold is the 80% entered by operator 506.

If rehoming the selected communication node to the destination voicemail node does not exceed the capacity management threshold, then voicemail network management system 500 associates the selected communication node with the destination voicemail node (operation 642). For example, if destination voicemail node 554 contains the capacity to be associated with communication node 560 and maintain a utilization of less than 80%, then voicemail network management system 500 rehomes communication node 560 to destination voicemail node 554.

However, if rehoming the selected communication node to the destination voicemail node exceeds the capacity management threshold, then voicemail network management system 500 determines whether capacity can be added to the destination voicemail node (operation 638). If capacity cannot be added to the destination voicemail node, then the process returns to operation 632 where the operator selects a different destination voicemail node for analysis. However, if capacity can be added to the destination voicemail node, then voicemail network management system 500 adds message nodes and/or access nodes to the destination voicemail node (operation 640). For example, voicemail network management system 500 determines that destination voicemail node 554 can accommodate one additional message node and two additional access nodes. Voicemail network management system 500 then adds message node 12 and access nodes 15 and 16 to destination voicemail node 554.

After voicemail network management system 500 adds capacity to the destination voicemail node, the process returns to operation 636 to determine whether the destination voicemail node can accommodate the rehomed communication node (operation 636). For example, after voicemail network management system 500 adds message node 12 and access nodes 15 and 16 to destination voicemail node 554, voicemail network management system 500 determines whether destination voicemail node 554 has the capacity to accommodate rehomed communication node 560. If destination voicemail node 554 has adequate capacity for communication node 560, then voicemail network management system 500 disassociates communication node 560 from source voicemail node 552 and associates communication node 560 with destination voicemail node 554.

While the operations of the method depicted in FIG. 6 are described above in conjunction with communication system 5000 of FIG. 5, the method may be executed by employing other systems or devices in other embodiments. Also, while FIG. 6 indicates a particular order of execution for the operations of the method illustrated therein, other orders of execution, including concurrent execution of one or more of the operations, are possible while remaining within the scope of the invention.

Figure 7:
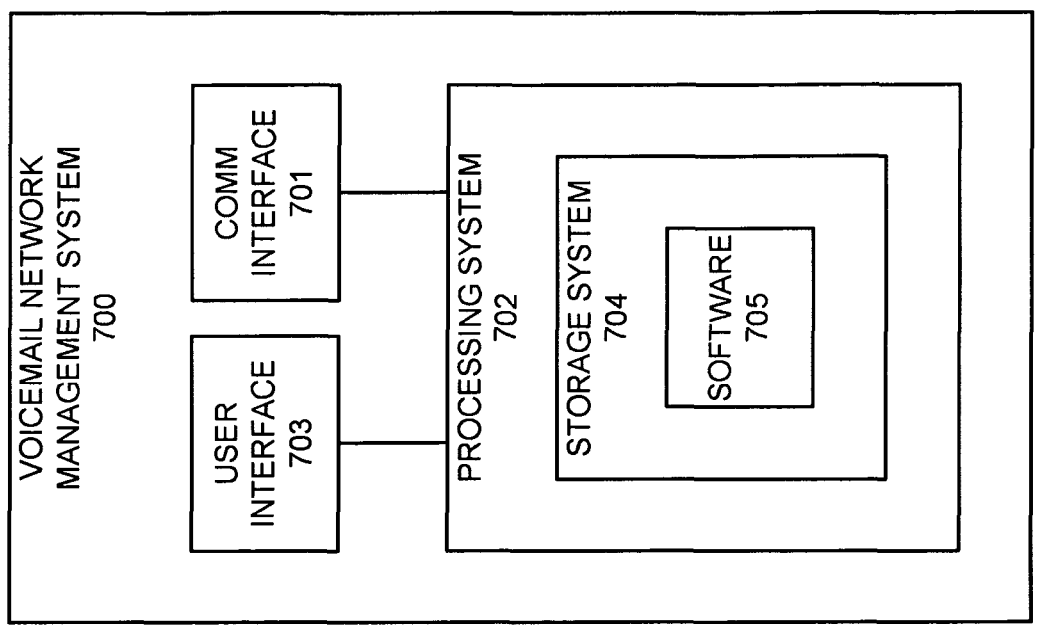
FIG. 7 is a block diagram that illustrates a voicemail network management system.

FIG. 7 is a block diagram that illustrates voicemail network management system 700. Voicemail network management system 700 includes communication interface 701, processing system 702, and user interface 703. Processing system 702 includes storage system 704. Storage system 704 stores software 705. Processing system 702 is linked to communication interface 701 and user interface 703. Voicemail network management system 700 could be comprised of a programmed general-purpose computer, although those skilled in the art will appreciate that programmable or special purpose circuitry and equipment may be used. Voicemail network management system 700 may be distributed among multiple devices that together comprise elements 701-705.

Communication interface 701 could comprise a network interface, modem, port, transceiver, or some other communication device. Communication interface 701 may be distributed among multiple communication devices. Processing system 702 could comprise a computer microprocessor, logic circuit, or some other processing device. Processing system 702 may be distributed among multiple processing devices. User interface 703 could comprise a keyboard, mouse, voice recognition interface, microphone and speakers, graphical display, touch screen, or some other type of user device. User interface 703 may be distributed among multiple user devices. Storage system 704 could comprise a disk, tape, integrated circuit, server, or some other memory device. Storage system 704 may be distributed among multiple memory devices.

Processing system 702 retrieves and executes software 705 from storage system 704. Software 705 may comprise an operating system, utilities, drivers, networking software, and other software typically loaded onto a computer system. Software 705 could comprise an application program, firmware, or some other form of machine-readable processing instructions. When executed by processing system 702, software 705 directs processing system 702 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing a voicemail network, the method comprising:
   receiving voicemail system data for the voicemail network, wherein the voicemail system data comprises communication node data, source voicemail node data, and destination voicemail node data;
   determining a destination voicemail node based upon the destination voicemail node data and a destination voicemail node criteria; and
   associating a communication node with the destination voicemail node when the source voicemail node data meets a source voicemail node criteria.

2. The method of claim 1, wherein receiving voicemail system data comprises receiving operational measurements of at least one of a communication node, a source voicemail node, and a destination voicemail node.

3. The method of claim 2, wherein receiving the operational measurements comprises receiving at least one of a number of subscribers, a number of busy hour call attempts, a number of message nodes, and a number of access nodes.

4. The method of claim 3, wherein determining a destination voicemail node based upon the destination voicemail node criteria comprises:
   analyzing a potential destination voicemail node based on a capacity of the potential destination voicemail node, wherein the capacity of the potential destination voicemail node comprises the number of message nodes and the number of access nodes; and
   analyzing the potential destination voicemail node based on a proximity of the potential destination voicemail node to the communication node.

5. The method of claim 1, wherein the source voicemail node data comprises a projected growth of a source voicemail node.

6. The method of claim 5, wherein the source voicemail node is associated with a plurality of communication nodes.

7. The method of claim 6, wherein associating the communication node with the destination voicemail node comprises analyzing the voicemail system data to select the communication node from the plurality of communication nodes.

8. The method of claim 1, further comprising, when the source voicemail node data meets the source voicemail node criteria, adding capacity to the source voicemail node.

9. The method of claim 1, further comprising, when the destination voicemail node data meets the destination voicemail node criteria, adding capacity to the destination voicemail node.

10. The method of claim 1, wherein determining a destination voicemail node based upon the destination voicemail node criteria comprises adding a voicemail node to the voicemail network.

11. A method of managing a voicemail network comprising a communication node associated with a source voicemail node, the method comprising:
    receiving voicemail system data for the voicemail network, wherein the voicemail system data comprises communication node data, source voicemail node data, and destination voicemail node data;
    determining a destination voicemail node based upon the destination voicemail node data and a destination voicemail node criteria, wherein the destination voicemail node criteria comprises a capacity of the destination node and a proximity of the destination node to the communication node; and
    associating the communication node with the destination voicemail node when the source voicemail node data meets a source voicemail node criteria.

12. The method of claim 11, wherein receiving voicemail system data comprises receiving operational measurements of at least one of a communication node, a source voicemail node, and a destination voicemail node.

13. The method of claim 12, wherein receiving the operational measurements comprises receiving at least one of a number of subscribers, a number of busy hour call attempts, a number of message nodes, and a number of access nodes.

14. The method of claim 13, wherein a message node comprises a message serving unit and an access node comprises a port.

15. The method of claim 12, wherein the source voicemail node data comprises a projected growth of a source voicemail node.

16. The method of claim 12, wherein the source voicemail node is associated with a plurality of communication nodes.

17. The method of claim 16, wherein associating the communication node with the destination voicemail node comprises analyzing the voicemail system data to select the communication node from the plurality of communication nodes.

18. The method of claim 11, further comprising, when the source voicemail node data meets the source voicemail node criteria, adding capacity to the source voicemail node.

19. The method of claim 11, further comprising, when the destination voicemail node data meets a destination voicemail node criteria, adding capacity to the destination voicemail node.

20. The method of claim 11, wherein determining a destination voicemail node based upon destination voicemail node criteria comprises adding a voicemail node to the voicemail network.

21. A voicemail network management system comprising:
- an interface configured to receive voicemail system data for a voicemail network, wherein the voicemail system data comprises communication node data, source voicemail node data, and destination voicemail node data;
- a processing system configured to process the voicemail system data to determine a destination voicemail node based upon the destination voicemail node data and a destination voicemail node criteria; and
- in response to determining a destination voicemail node, the processing system configured to process the voicemail system data to associate a communication node with the destination voicemail node when the source voicemail node data meets a source voicemail node criteria.

\* \* \* \* \*

UNITED STATES PATENT AND TRADEMARK OFFICE
CERTIFICATE OF CORRECTION

PATENT NO. : 8,422,645 B1
APPLICATION NO. : 12/170702
DATED : April 16, 2013
INVENTOR(S) : Kanglung Wong et al.

Page 1 of 1

It is certified that error appears in the above-identified patent and that said Letters Patent is hereby corrected as shown below:

On the title page, at [73], please delete Assignee "Spring Communications Company L.P." and add Assignee -- Sprint Communications Company L.P. --.

Signed and Sealed this
Twenty-fifth Day of June, 2013

Teresa Stanek Rea
*Acting Director of the United States Patent and Trademark Office*